United States Patent [19]

Goertzen

[11] 4,247,242
[45] Jan. 27, 1981

[54] QUICK ATTACHMENT DEVICE

[75] Inventor: Gerold G. Goertzen, Appleton, Wis.

[73] Assignee: Farmhand, Inc., Minneapolis, Minn.

[21] Appl. No.: 3,372

[22] Filed: Jan. 15, 1979

[51] Int. Cl.³ .............................. B66F 9/04; E02F 3/72
[52] U.S. Cl. ................................. 414/686; 280/460 A;
292/155; 292/341.18; 403/337; 414/912
[58] Field of Search ............... 414/686, 722, 723, 727,
414/912; 292/155, 302, 341.18; 403/336–338,
335; 37/117.5; 172/272–275; 248/672, 201,
223.3; 280/460 A, 415

[56] References Cited

U.S. PATENT DOCUMENTS

| 3,912,095 | 10/1975 | Miller | 172/274 X |
|---|---|---|---|
| 3,939,997 | 2/1976 | Frank | 172/272 X |
| 3,982,643 | 9/1976 | MacGregor | 414/686 |
| 3,991,890 | 11/1976 | Frank | 172/275 X |
| 4,033,469 | 7/1977 | Frank | 172/272 X |
| 4,065,009 | 12/1977 | Old | 414/686 |
| 4,136,792 | 1/1979 | Wilson | 414/723 |

Primary Examiner—Robert G. Sheridan
Assistant Examiner—Terrance L. Siemens
Attorney, Agent, or Firm—Dorsey, Windhorst, Hannaford, Whitney & Halladay

[57] ABSTRACT

A quick connect and disconnect device for releasably attaching an implement such as a front end loader to a tractor in which the implement includes side frame members adapted for positioning on opposite sides of the tractor. The device includes a side support bracket on each side of the tractor, a connection means having an opening and means for securing and releasing the same relative to the side support bracket, a foot portion connected with the side frame members with a second opening for alignment with the first opening of the connection member, and a pin member for extension through the aligned first and second openings.

10 Claims, 11 Drawing Figures

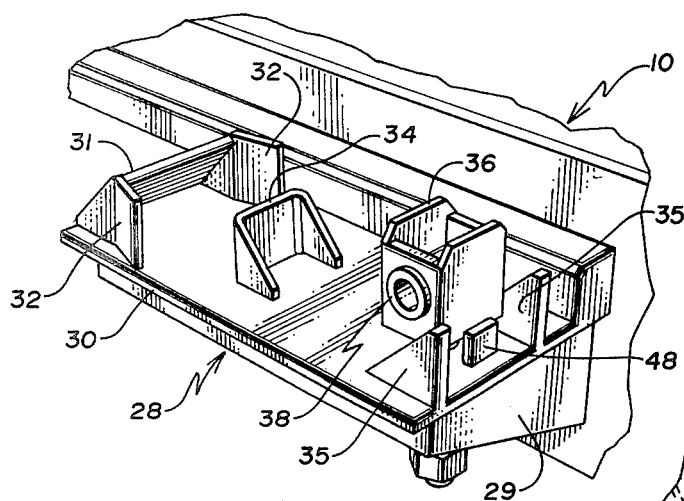
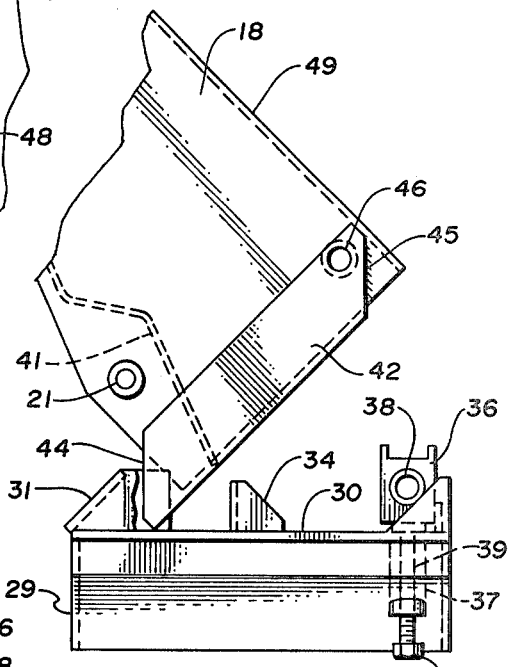
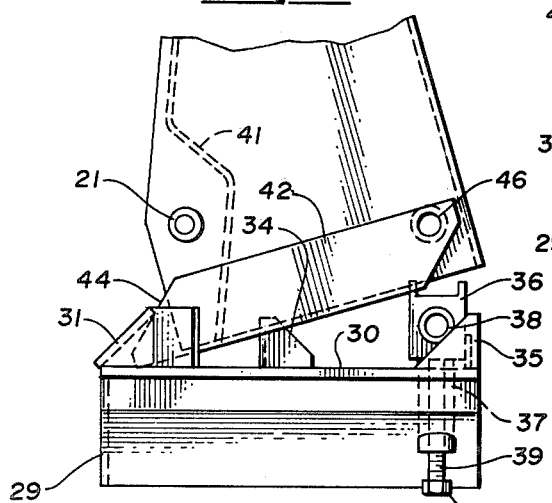
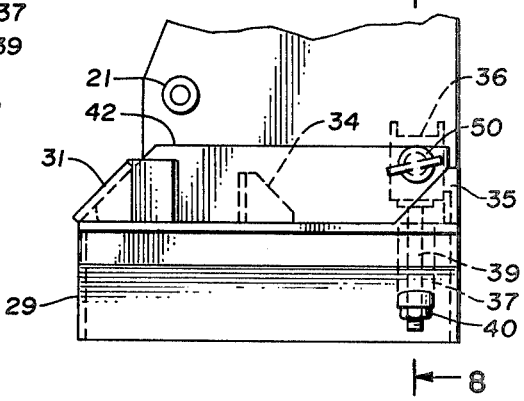
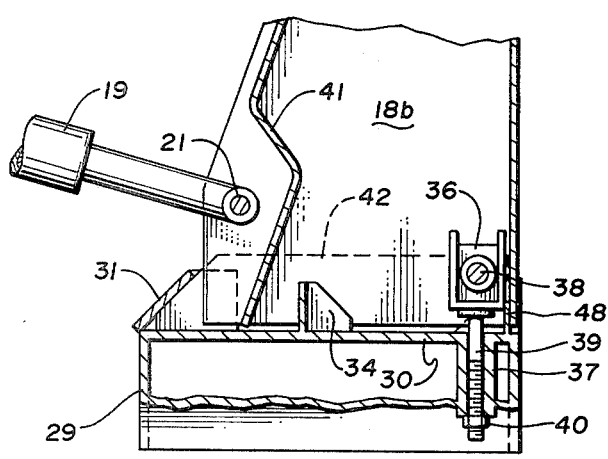

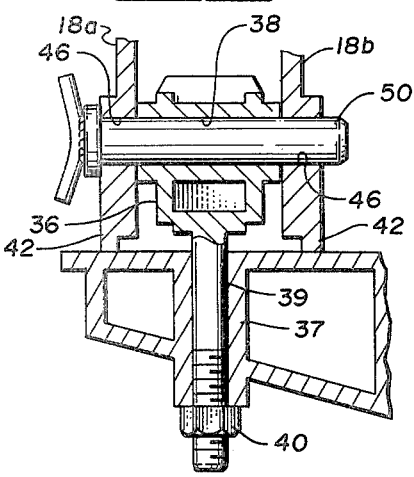
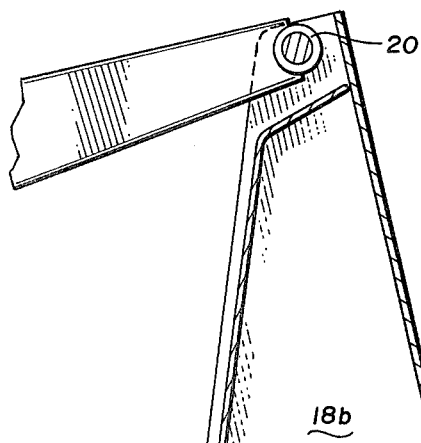
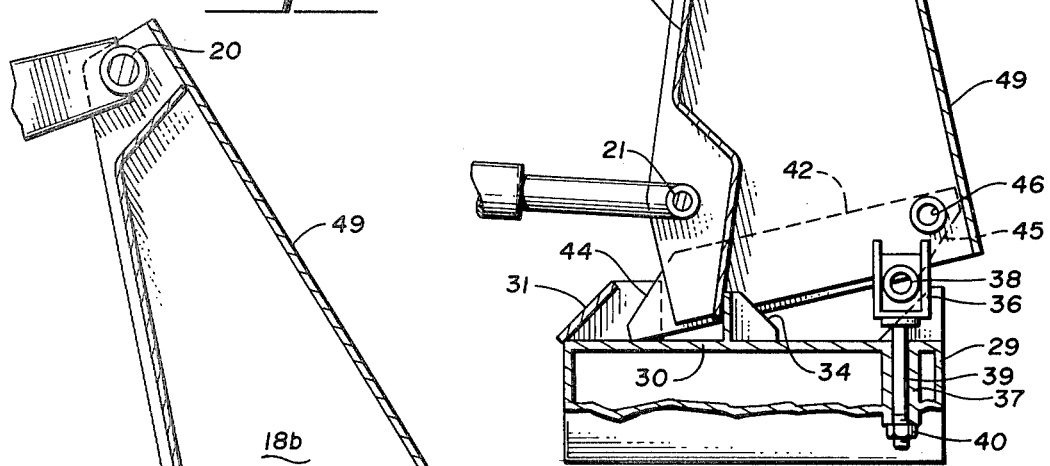
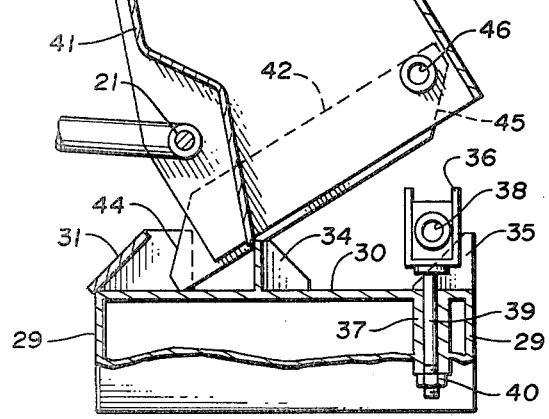
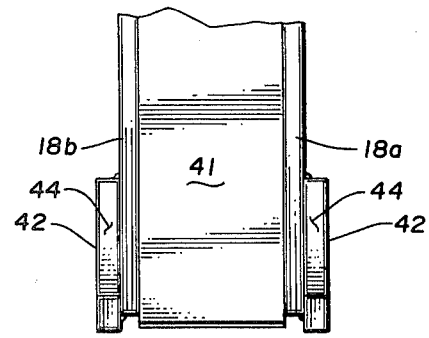

4,247,242

QUICK ATTACHMENT DEVICE

BACKGROUND OF THE INVENTION

The present invention relates generally to a quick connect and disconnect device for releasably attaching an implement to a tractor, and more particularly, to a device enabling the quick attachment and detachment of a front end loader relative to a tractor or other such vehicle.

Front end loaders or other similar implements designed for use with tractors are conventionally adapted for removal therefrom so that the tractor can be used for other purposes. A variety of devices have been used in the past to facilitate the removal of such a loader or other implement from the tractor. A desirable feature of such device is that it enables the implement to quickly and easily connect to and disconnect from the tractor to minimize the down time and maximize the use of the tractor both with and without such implement. A further desirable feature is that it supports the loader on the tractor with sufficient strength and rigidity to minimize vibration and movement between such support and the tractor. This latter feature is particularly important in equipment where the implement is designed for connection to the tractor main frame at a localized point on each side of the tractor, rather than at several points along the tractor frame by an implement main frame to spread out the stresses. In structures where connection is made only at a single point on each side of the tractor, a solid connection is needed to withstand the stresses developed at that point.

Accordingly, there is a need in the art for an improved quick connect and disconnect device for a front end loader or other implement, and particular need for a quick connect and disconnect device for rigidly and securely connecting the loader to the main frame of a tractor.

SUMMARY OF THE INVENTION

In general, the present invention is a quick connect and disconnect device for releasably attaching an implement such as a front end loader to a tractor. More particularly, the present invention is a quick connect and disconnect device for a front end loader which is connected directly with the main frame of the tractor at a localized point on either side thereof. The device not only facilitates quick connection and disconnection, but also provides for the connection to be a solid connection. Failure to provide such a connection results in extensive vibration during operation of the device and usually insufficient support for the loader.

The quick attachment feature of the present invention incorporates a floating block or connection member associated with a side support bracket connected directly to the mainframe of the tractor. The connection member is movable relative to the support bracket and includes an opening adapted for alignment with a corresponding opening in a portion of the loader. Following initial alignment of the tractor relative to the loader, the connection member is moved to align the openings and a pin is inserted therein. A threaded member connected with the connection member is then tightened to solidify the connection between the loader and the side support brackets.

The structure of the present invention includes a mounting foot connected to the front end loader or implement which connects with an associated support bracket or mounting shoe on the tractor. The support bracket includes an inclined toe portion near the forward end with a pair of outwardly angled guide plates and a beveled toe plate. Rearwardly of the toe portion is an upstanding stop member which facilitates detachment of the loader from the vehicle. Rearwardly of the stop member is the floating block or connection member. Rearwardly of the connection member is a pair of triangular shaped beveled portions which serve to help secure the mounting foot of the loader to the mounting shoe. The mounting foot includes beveled surfaces adapted for engagement with corresponding beveled surfaces of the support bracket.

Initial engagement between the vehicle and the loader during attachment is accomplished as in the prior art by driving the tractor into general alignment with the loader and connecting the hydraulic hoses. Then, through appropriate actuation of the hydraulic cylinder means, mounting engagement is made between the mounting foot and the support bracket. To complete the alignment and connection, the opening in the connection member is manually moved into alignment with a corresponding hole in the mounting foot enabling the locking pin to be inserted therethrough. The threaded member connected with the connection member is then tightened to securely wedge the mounting foot into engagement with the beveled surfaces of the support bracket, and thus solidly connect the front end loader with the tractor.

When disconnection of the loader is desired, the threaded member of the connection member is loosened, the pin retracted and the loader moved out of engagement with the support bracket through actuation of the hydraulic cylinder means. During such removal, the stop member on the support bracket serves to limit the rearward movement of the mounting foot, and thereby prevent interference between the mounting foot and portions of the tractor.

Accordingly, an object of the present invention is to provide an improved quick connect and disconnect device for releasably attaching a front end loader to a tractor or other vehicle.

Another object of the present invention is to provide a quick connect and disconnect device for attaching a front end loader to a tractor which also provides for a solid connection between the loader and the tractor.

Another object of the present invention is to provide a quick connection and disconnect device which includes means for preventing interference between the loader and portions of the tractor during attachment and detachment of such loader.

These and other objects of the present invention will become apparent with reference to the drawings, the description of the preferred embodiment and the appended claims.

DESCRIPTION OF THE DRAWINGS

FIG. 3 is a pictorial view showing one of the side support brackets secured to the tractor frame.

FIG. 4 is a side view of the quick connect and disconnect device of the present invention showing the initial engagement between the front end loader frame and the mounting shoe.

FIG. 5 is a side view similar to that of FIG. 4 showing the mounting of the front end loader to the tractor.

FIG. 6 is a side view similar to the views of FIGS. 4 and 5 showing the front end loader in its connected position relative to the mounting shoe.

FIG. 7 is a side view, partially in section, showing a portion of the side frame member in its connected position relative to the mounting shoe.

FIG. 8 is a side view, partially in section, as viewed along the section line 8—8 of FIG. 6.

FIG. 9 is a side view, partially in section, showing a portion of the front end loader during disconnection from the tractor.

FIG. 10 is a side view similar to that of FIG. 9 showing further disconnection of the front end loader from the tractor.

FIG. 11 is a plan view of the lower, forward end of the portion of the side frame member adapted for connection with the mounting shoe.

DESCRIPTION OF THE PREFERRED EMBODIMENT

Figure 1:
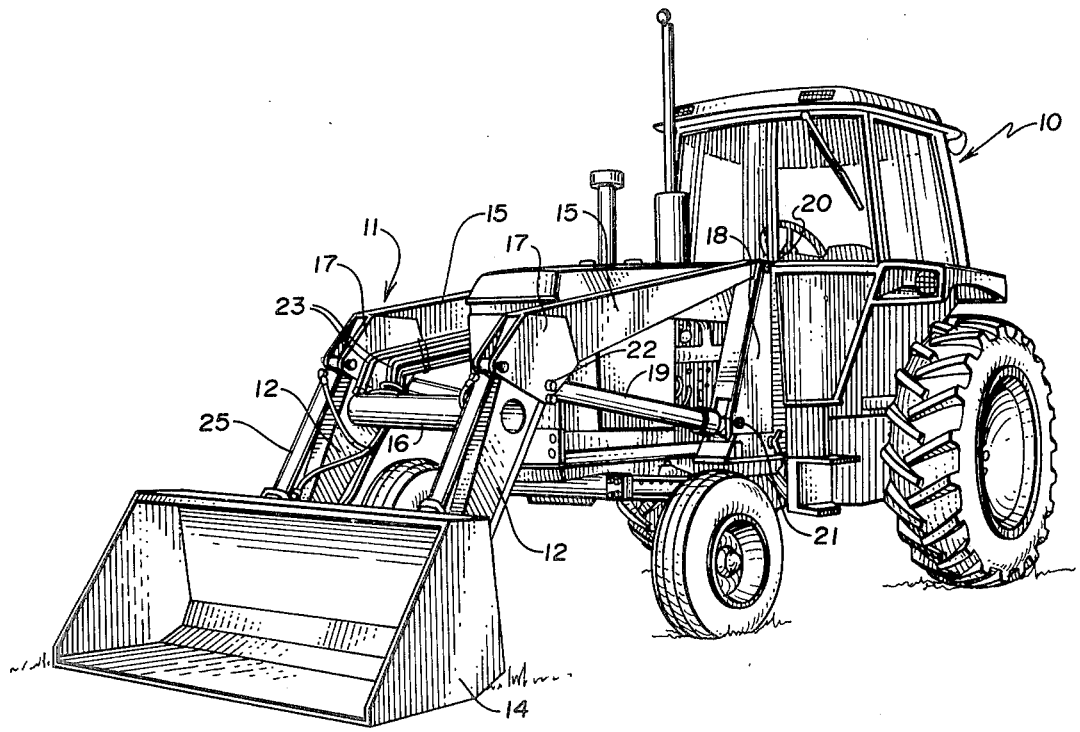
FIG. 1 is a pictorial view showing a tractor and front end loader embodying the quick connect and disconnect means of the present invention.
Figure 2:
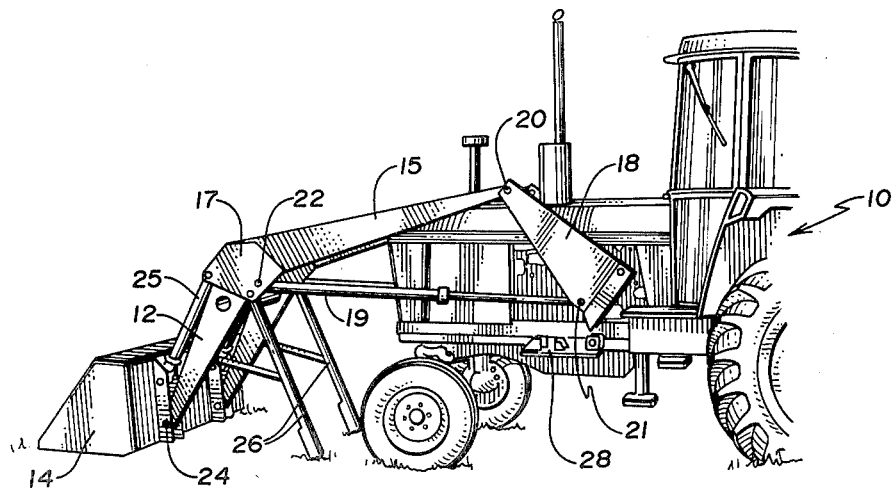
FIG. 2 is a pictorial view showing a tractor and front end loader in position for connection of the loader to the tractor.

Reference is first made to FIGS. 1 and 2 which are pictorial views showing a tractor 10 and a front end loader 11. In FIG. 1, the loader 11 is secured to the tractor in operating position, while in FIG. 2, the loader 11 is shown in position for connection to the tractor. While reference will be made throughout the description of the preferred embodiment and claims to a tractor and front end loader, it is contemplated that the device of the present invention is also applicable to similar vehicles such as track vehicles and the like. Thus reference in the present case to the term "tractor" is intended to cover such other vehicles as well. Similarly, the invention may be applicable to implements other than front end loaders, however, the description of the preferred embodiment will be with respect to a front end loader.

The front end loader 11 includes a pair of laterally spaced side frame members adapted to be positioned on opposite sides of the tractor. Each of the side frame members includes a lower loader arm 12, an associated side lift frame arm 15 and an upright frame member 18. The lift frame arm 15 and lower loader arm 12 on each side of the loader are rigidly secured together at one of their ends by an appropriate pair of connecting plates 17. The other end of each of the lift arms 15 is pivotally connected at the pivot 20 to one of the upright frame members 18.

As illustrated best in FIG. 2, the lower ends of the loader arms 12 are pivotally secured to a bucket 14 at the pivot 24. Positioned above each of the loader arms 12 is a hydraulic tilt cylinder 25 having one end pivotally connected to a portion of the bucket 14 and the other end connected with a portion of the connecting plates 17. By appropriate actuation of the cylinders 25, the bucket 14 can be tilted forward or rearward about the pivots 24. A lift cylinder mechanism 19 extends between, and is pivotally connected to, each upright frame member 18 and its corresponding pair of connecting plates 17. The ends of the lift cylinders 19 are connected at the pivot points 21 and 22.

As is conventional in the art, extension and retraction of the lift cylinders 19 causes raising and lowering of the bucket 14 when the loader 11 is secured to the tractor 10 as illustrated in FIG. 1. When the loader 11 is not connected with the tractor 10 as shown in FIG. 2, extension and retraction of the lift cylinder 19 merely causes the upstanding frame members 18 to pivot about the pivot point 20. When the loader 11 is free-standing without connection to the tractor 10, a pair of support stands 26 are connected with the loader to support the same.

Reference is next made generally to FIGS. 3–9 showing the quick connect and disconnect means of the present invention, and more particularly, to FIG. 3 showing one of the mounting shoes or side support brackets 28 secured to one side of the tractor 10. As illustrated, a quick attachment mounting shoe or side support bracket 28 is adapted for rigid securement to the main frame on one side of the tractor 10 by conventional means such as bolts, welding or the like. A similar side support bracket 28 is mounted to the other side of the tractor 10. The support bracket 28 includes a mounting bracket 29 which is secured to the tractor 10 and supports a relatively flat mounting plate 30. A toe portion is disposed near the forward end of the mounting plate 30 and includes a beveled or inclined toe plate 31. As illustrated, the inclined plate 31 extends upwardly and rearwardly from the forward end of the plate 30 and defines a first beveled engagement surface on its bottom side. A pair of generally outwardly angled or diverging guide plates 32 disposed on the plate 30 diverge outwardly from the toe plate 31 to help guide the mounting foot portion of the loader into connecting engagement as described below. In the preferred embodiment, the toe plate 31 and each of the guide plates 32 are rigidly secured to each other and to the mounting plate 30 by welding or other appropriate means.

An upstanding stop member 34 is positioned rearwardly of the toe portion and generally near the center of the plate 30. The member 34 is rigidly secured to the plate 30 by welding and includes a generally flat portion disposed at right angles to the plate 30 and a pair of rearwardly extending beveled portions. As will be described in more detail below, the stop member 34 is adapted for engagement with a portion of the mounting foot on the loader to limit the rearward movement of the mounting foot, and thus prevents interference between the loader and tractor during disconnection of the loader.

A pair of generally triangular-shaped members 35 are rigidly secured to the mounting plate 30 at its rearward end by welding or other appropriate connection means. These members are laterally spaced from each other and disposed at right angles relative to the plate 30. The upper surfaces of such members 35 define a second beveled surface adapted for engagement with a corresponding surface of the mounting foot when the loader is connected to the tractor.

Associated with each side support bracket 28 and positioned between the first and second beveled surfaces of the toe plate 31 and the members 35 is a connection means for securing the front end loader to the side support brackets 28. The connection means includes a floating or movable connection member 36 positioned above the plate 30 with an opening 38 extending therethrough. The connection member 36 is a generally rectangularly shaped element having a width less than the distance between the laterally spaced members 35. In the preferred embodiment, the member 36 is positioned between the members 35 and is oriented so that the generally horizontal opening 38 is at right angles to the longitudinal axis of the tractor. The member 36 and opening 38 are maintained in this alignment by the stop 48 which prevents rotation of the member 36 relative to the plate 30.

The connection means 36 also includes securement means for quickly securing and releasing the member 36 relative to the bracket 28. In the preferred embodiment, this means comprises the threaded member 39 best illustrated in FIGS. 4–8. The member 39 is rigidly connected with the bottom of the connection members 36 by welding and extends downwardly through the plate 30 and through an alignment sleeve 37. The sleeve 37 is integrally joined with, and extends below, the lower surface of the plate 30. A threaded nut 40 is threadedly received by the threaded member 39. When the nut 40 is tightened against the sleeve 37, the member 36 is drawn into rigid connection with the plate 30. In the preferred embodiment, the internal diameter of the sleeve 37 is greater than the diameter of the threaded member 39 to permit limited movement of the member 39 within the sleeve 37, and thus limited movement of the connection member 36 when the nut 40 is loosened.

With continuing reference to FIGS. 4–9 it can be seen that the lower portion of each of the loader frame members 18 includes a mounting foot adapted for connection with one of the side support brackets 28. In the preferred embodiment, the mounting foot includes a pair of laterally spaced mounting plates 42 positioned on opposite sides of each of the loader frame members 18 near their lower end. As illustrated, each of the members 18 is a generally hollow member having a pair of side plates 18a and 18b (FIGS. 8 and 9) and a pair of spacing members 41 and 49 disposed between and welded to the inner surfaces of the plates 18a and 18b. The pair of mounting plates 42 are rigidly secured by welding to the outer surface of the plates 18a and 18b. Each of the plates 42 includes an upper beveled surface 44 near its forward end and a lower beveled surface 45 near its rearward end. As illustrated best in FIGS. 4–7, the beveled surfaces 44 are adapted for wedging engagement with the lower beveled surface of the toe plate 31, while the beveled surfaces 45 are adapted for wedging engagement with the upper beveled surfaces of the members 35. Each of the mounting plates 42, and thus each of the mounting feet, includes an opening or hole 46 extending therethrough. The opening 46 is adapted for alignment with the opening 38 in the connection member 36 as illustrated in FIGS. 6 and 7. When the mounting feet are generally aligned with the side brackets 28 by actuation of the lift cylinders 19 (FIG. 1), the member 36 is moved to align the openings 38 and 46. A pin 50 (FIG. 6) is then inserted through the openings to connect the mounting feet with the connecting members 36. The nut 40 on the threaded member 39 is then tightened, thus wedging the beveled surfaces 44 and 45 into engagement with the surfaces of the plate 31 and the members 35, and rigidly securing the mounting foot and the entire front end loader to the side support brackets 28.

FIGS. 10 and 11 show the front end loader as it is being disconnected from the support bracket 28. As shown, the mounting foot includes a portion adapted for engagement with the stop member 34 during rearward pivotal movement of the frame member 18 about the pivot 20. As will be discussed in more detail below, this engagement limits the rearward movement of the member 18 relative to the bracket 28, and thus prevents interference between the member 18 and portions of the tractor during disconnection. In the preferred embodiment, the mounting foot portion adapted for such engagement consists of the lower end of the spacing member 41.

Having described the preferred embodiment of the present invention, the operation of the quick connect and disconnect device can be understood as follows. Prior to attaching the front end loader to the tractor 10, the loader 11 is free-standing as illustrated best in FIG. 2. In its free-standing position, the loader is supported by the pair of support stands 26. To connect the loader 11 to the tractor 10, the tractor 10 is driven between the side frame members of the loader to the position generally illustrated in FIG. 2. In this position, the side support brackets 28 are positioned below and forward of the lower ends of the side loader frame members 18. The hydraulic hoses 23 associated with the lift cylinders 19 are then connected to a hydraulic fluid source on the tractor and the lift cylinders retracted. During such retraction, the pair of loader frame members 18 pivot downwardly about the pivot 20. During this downward pivotal movement, the forward ends of the mounting feet plates 42 engage the upper surface of the mounting plate 30 as illustrated in FIG. 4. Upon further retraction of the cylinders 19, the plates 42 are guided by the guide members 32 toward the toe plate 31. When initial engagement is made between the beveled surface 44 and the toe plate 31, as shown in FIG. 5, further forward movement of the mounting foot relative to the support plate 28 is prevented. Instead, continued retraction of the cylinder 19 results in rearward movement of the entire forward portion of the loading device. As retraction of the cylinders 19 is continued, the forward portion of the loader 11, including the bucket 14, is moved rearwardly until a position is reached in which the forward beveled surfaces 44 are disposed under the beveled toe plate 31 and the rearward beveled surfaces 45 are in engagement with the beveled surfaces of the members 35 as shown in FIG. 6.

When in this position, the member 36 is disposed between the plates 42, is manually moved to align the openings 38 and 46. When so aligned, the pin member 50 is inserted through the openings 38 and 46 and the nut 40 is tightened. The tightening of the nut 40 draws the member 36, and thus the mounting plates 42 and the loader assembly downwardly into engagement with the side support brackets 28. In this position, the beveled surfaces 44 are wedged beneath the toe plate 31 and the beveled surfaces 45 are wedged against the beveled surfaces of the members 35. This results in a solid connection between the loader and the tractor sufficient to prevent any vibrations and sufficient to provide the necessary support.

If, during mounting of the loader, it turns out that the tractor is not perfectly aligned, the angled guide plates 32 on either side of the toe plate 31 serve to guide the foot members 42 into proper alignment with such toe portion 31. When the nut 40 associated with each support bracket has been tightened, the support stands 26 can be removed.

When disconnection of the loader from the tractor is desired, the procedure described above is reversed. First, the support stands 26 are connected. Next, the bolts 40 on either side of the tractor are loosened and the pins 50 removed. The hydraulic lift cylinders 19 are then extended. During initial extension of the cylinders 19, the loader frame arms 18 pivot rearwardly about the pivots 20 until engagement is made between the lower end of the spacing member 41 and the stop member 34 as illustrated in FIG. 10. This engagement limits further rearward movement of the frame arms 18 relative to the brackets 28. Thus, during such engagement, further extension of the cylinders 19 causes forward movement of the loader 11 and bucket 14 relative to the tractor 10. As extension of the cylinders 19 continues, a position illustrated in FIG. 11 is reached in which the member 41 is no longer in engagement with the stop member 34. When this occurs, the frame arms 18 simply continue to pivot upwardly about the pivot 20 as the cylinders extend. Thus presence of the stop member 34 and its engagement with the member 41 limits the rearward movement of the frame arms 18 during disconnection, and thus prevents interference with or damage to portions of the tractor. After the cylinder 19 has been sufficiently extended, the hydraulic hoses 23 are removed and the tractor backed away from the loader.

Although the description of the preferred embodiment has been quite specific, it is contemplated that various modifications could be made to the structure of the present invention without deviating from the spirit thereof. For example, the preferred embodiment shows the securement means as comprising a threaded member 39 with a threaded nut 40. It is contemplated that this means could include structure other than a threaded member such as a cam mechanism. Accordingly, it is intended that the scope of the present invention be dictated by the appended claims rather than by the description of the preferred embodiment.

I claim:

1. A quick connect and disconnect device for releasably attaching an implement to a tractor in which said implement includes side frame members adapted to be positioned on opposite sides of said tractor, said device comprising:
    side support brackets on opposite sides of said tractor;
    connection means associated with each of said side support brackets, said connection means including a connection member having a first opening extending horizontally therethrough and being movable relative to said side support bracket, said connection means further including securement means for quickly securing and releasing said connection member relative to said side support bracket;
    mounting foot portions connected with each of said side frame members and adapted for mounting to said side support brackets, said foot portions including a second opening for selective alignment with said first opening of said connection member; and
    pin means for selective extension through said aligned first and second openings.

2. The quick connect and disconnect device of claim 1 wherein said securement means includes a threaded member extending through a portion of said side support bracket and a threaded nut for threaded engagement with said threaded member.

3. The quick connect and disconnect device of claim 2 wherein said side support brackets and said mounting foot portions include cooperating beveled surfaces.

4. The quick connect and disconnect device of claim 3 wherein the beveled surfaces of said side support brackets include first and second beveled surfaces disposed near the forward and rearward ends, respectively, of said side support brackets and wherein the beveled surfaces of said mounting foot portions include third and fourth beveled surfaces adapted for cooperative engagement with said first and second beveled surfaces, respectively.

5. The quick connect and disconnect device of claim 4 wherein each of said side support brackets includes an inclined toe member having an inclined portion extending upwardly and rearwardly from a forward portion thereof and wherein the lower surface of said inclined portion defines said first beveled surface.

6. The quick connect and disconnect device of claim 5 wherein each of said side support brackets includes a pair of guide members diverging outwardly and rearwardly from said toe member for guiding said mounting foot into mounting relation with said support bracket.

7. The quick connect and disconnect device of claim 6 wherein each of said mounting feet includes a pair of laterally spaced mounting plates.

8. The quick connect and disconnect device of claim 7 wherein said second opening extends through each of said mounting plates and said connecting member is adapted for disposition between said connecting member.

9. The quick connect and disconnect device of claim 8 wherein each of said side frame members includes pivotally connected boom and upright members and a hydraulic lift cylinder positioned therebetween.

10. The quick connect and disconnect device of claim 9 wherein each of said side support brackets includes an upstanding stop member disposed rearwardly of said toe member and said mounting foot includes a portion adapted for engagement therewith to limit the rearward movement of said mounting foot during extension of lift cylinders and disconnection of said implement.

* * * * *